(12) United States Patent
Kasztelan et al.

(10) Patent No.: US 6,251,261 B1
(45) Date of Patent: Jun. 26, 2001

(54) CATALYST THAT COMPRISES A CLAY AND AN ELEMENT OF GROUP VB, AND ITS USE IN HYDROCRAKING OF PETROLEUM FEEDSTOCKS THAT CONTAIN HYDROCARBON

(75) Inventors: Slavik Kasztelan, Rueil Malmaison; Eric Benazzi, Chatou; Nathalie Marchal-George, Saint Genis Laval, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/344,348

(22) Filed: Jun. 25, 1999

(30) Foreign Application Priority Data

Jun. 25, 1998 (FR) .................................................. 98 08042

(51) Int. Cl.⁷ ............................ C10G 47/02; B01J 21/16; B01J 23/847; B01J 27/049; B01J 27/12
(52) U.S. Cl. ..................................... 208/111.1; 208/111.2; 208/111.3; 208/111.35; 502/74; 502/84; 502/204; 502/207; 502/211; 502/213; 502/219; 502/221; 502/246; 502/254; 502/257; 502/311; 502/314; 502/353; 502/354
(58) Field of Search .................................. 502/74, 80, 81, 502/202, 204, 207, 208, 211, 213, 214, 219, 221, 222, 246, 254, 258, 259, 260, 263, 311, 314, 325, 327, 332, 353, 354

(56) References Cited

U.S. PATENT DOCUMENTS

| 4,169,927 | 10/1979 | Hill et al. ............................ 526/124 |
|---|---|---|
| 4,465,892 | * 8/1984 | Jacobs et al. ........................ 585/666 |
| 4,469,804 | * 9/1984 | Johnson ................................ 502/32 |
| 4,666,877 | * 5/1987 | Vaughan ................................ 502/84 |
| 5,374,349 | * 12/1994 | Occelli ................................ 208/111 |
| 5,614,453 | * 3/1997 | Occelli ................................ 502/66 |
| 5,961,816 | * 10/1999 | Benazzi et al. ................... 208/111.3 |
| 5,997,725 | * 12/1999 | Benazzi et al. ................... 208/111.3 |
| 6,037,300 | * 3/2000 | Kasztelan et al. .................... 502/204 |

FOREIGN PATENT DOCUMENTS

| 0 343 048 | 11/1989 | (EP) . |
|---|---|---|
| 0 537 064 | 4/1993 | (EP) . |
| 098233A1 | * 8/1999 | (EP) . |
| 2 569 995 | 3/1986 | (FR) . |
| 2 036 582 | 7/1980 | (GB) . |

* cited by examiner

Primary Examiner—Bekir L. Yildirim
(74) Attorney, Agent, or Firm—Millen, White, Zelano & Branigan, P.C.

(57) ABSTRACT

The invention relates to a hydrocracking catalyst that comprises at least one oxide-type amorphous or poorly crystallized matrix, at least one element of group VB, preferably niobium, and at least one clay that is selected from the group that is formed by the 2:1 dioctahedral phyllosilicates and the 2:1 trioctahedral phyllosilicates, optionally at least one element that is selected from among the elements of group VIB and group VIII, optionally at least one element that is selected from the group that is formed by P, B, Si, and optionally at least one element of group VIIA. The invention also relates to the use of this catalyst in hydrocracking of feedstocks that contain hydrocarbon.

25 Claims, No Drawings

CATALYST THAT COMPRISES A CLAY AND AN ELEMENT OF GROUP VB, AND ITS USE IN HYDROCRAKING OF PETROLEUM FEEDSTOCKS THAT CONTAIN HYDROCARBON

This invention relates to a catalyst for hydrocracking feedstocks that contain hydrocarbon, whereby said catalyst comprises at least one oxide-type amorphous or poorly crystallized matrix, at least one element (metal) of group VB (group 5 according to the new notation of the periodic table: Handbook of Chemistry and Physics, 76th Edition, 1995–1996, first inside cover page), preferably niobium, at least one clay, optionally at least one element (metal) that is selected from among group VIB and/or group VIII (group 6 and groups 8, 9 and 10 according to the new notation of the periodic table), preferably molybdenum and tungsten, cobalt, nickel and iron. The catalyst also optionally contains an element that is selected from the group that consists of boron, phosphorus and. silicon (B, P, Si) and optionally at least one element of group VIIA (group of halogens, group 17 according to the new notation of the periodic table), such as, for example, fluorine.

This invention also relates to the processes for preparation of said catalyst, as well as its use for hydrocracking feedstocks that contain hydrocarbon such as petroleum fractions, the fractions that are obtained from the carbon that contains aromatic and/or olefinic and/or naphthenic and/or paraffinic compounds, whereby said feedstocks optionally contain metals, and/or nitrogen and/or oxygen and/or sulfur.

The hydrocracking of the heavy petroleum fractions is a very important refining process that makes it possible to produce, from excess heavy feedstocks that cannot be readily upgraded, lighter fractions, such as gasolines, jet fuels and light gas oils that the refiner seeks to adapt his production to the structure of the demand. Some hydrocracking processes make it possible also to obtain a highly purified residue that can constitute excellent bases for oils. Relative to catalytic cracking, the advantage of the catalytic hydrocracking is to provide middle distillates, jet fuels and gas oils of very good quality. The gasoline that is produced has a much lower octane number than the one that is obtained from catalytic cracking.

The catalysts that are used in hydrocracking are all of bifunctional type combining an acid function with a hydrogenating function. The acid function is provided by large-surface supports (150 to 800 $m^2 \cdot g^{-1}$ generally) that have a surface acidity, such as halogenated (particularly chlorinated or fluorinated) aluminas, combinations of boron and aluminum oxides, amorphous silica-aluminas and clays. The hydrogenating function is provided either by one or more metals of group VIII of the periodic table, such as iron, cobalt, nickel, ruthenium, rhodium, palladium, osmium, iridium and platinum, or by a combination of at least one metal of group VI of the periodic table, such as molybdenum and tungsten and at least one metal of group VIII.

The equilibrium between the two acid and hydrogenating functions is the basic parameter that controls the activity and the selectivity of the catalyst. A weak acid function and a strong hydrogenating function provide catalysts that are not very active and that work at a generally elevated temperature (greater than or equal to 390° C.) and at a low feed volumetric flow rate (the VVH that is expressed by volume of feedstock to be treated per unit of volume of catalyst and per hour is generally less than or equal to 2), but provided with a very good selectivity of middle distillates. Conversely, a strong acid function and a weak hydrogenating function provide active catalysts but have poorer selectivities of middle distillates. The search for a suitable catalyst will therefore be centered on a judicious selection of each of the functions to adjust the activity/selectivity pair of the catalyst.

It is thus one of the great advantages of hydrocracking to offer high flexibility at various levels: flexibility as far as the catalysts that are used are concerned, which ensures flexibility of the feedstocks that are to be treated and as far as the products that are obtained are concerned. An easy parameter to control is the acidity of the support of the catalyst.

The conventional catalysts of the catalytic hydrocracking consist of, for the large majority, weakly acidic supports, such as amorphous silica-aluminas, for example. These systems are more particularly used for producing middle distillates of very good quality, and also, when their acidity is very low, oil bases.

In the supports that are not very acidic is found the family of amorphous silica-aluminas. Many hydrocracking market catalysts have a combined silica-alumina base, either with a metal of group VIII or preferably when the contents of heteroatomic poisons of the feedstock that is to be treated exceed 0.5% by weight, with a combination of sulfides of the metals of groups VIB and VIII. These systems have a very good selectivity of middle distillates, and the products that are formed are of good quality. These catalysts, for the less acidic among them, can also produce lubricating bases. The drawback of all of these catalytic systems with an amorphous support base is, as has been said, their weak activity.

In contrast, simple sulfides of elements of group VB have been described as components of hydrorefining catalysts of feedstocks that contain hydrocarbon, such as, for example, the niobium trisulfide in U.S. Pat. No. 5,294,333. Mixtures of simple sulfides that comprise at least one element of group VB and an element of group VIB have also been tested as components of hydrorefining catalysts of feedstocks that contain hydrocarbon, such as, for example, in U.S. Pat. Nos. 4,910,181 or 5,275,994.

The research work that has been carried out by the applicant on clays and on hydrogenating active phases led him to discover that, in a surprising way, a catalyst for hydrocracking feedstocks that contain hydrocarbon comprises at least one generally porous, amorphous or poorly crystallized matrix such as alumina, at least one element of group VB of the periodic table, such as tantalum, niobium and vanadium, preferably niobium, at least one clay that is selected from the group that is formed by the 2:1 dioctahedral phyllosilicates such as, for example, montmorillonite, beidellite, vermiculite and the 2:1 trioctahedral phyllosilicates, such as, for example, talc, hectorite and saponite.

The phyllosilicate is preferably synthesized in a fluoride medium that is optionally bridged, whereby the phyllosilicate preferably exhibits a large reticular distance (whereby the reticular distance is the sum of the thickness of a layer and the interlayer space); clay is preferably a 2:1 dioctahedral phyllosilicate.

The catalyst also optionally comprises at least one element of group VIB of said classification, such as chromium, molybdenum and tungsten, preferably molybdenum or tungsten, even more preferably molybdenum, optionally an element of group VIII, i.e., an element that is selected from the group that consists of: Fe, Ru, Os, Co, Rh, Ir, Ni, Pd, and Pt, preferably iron, cobalt or nickel, optionally a promoter element that is selected from the group that consists of boron, silicon, and phosphorus, optionally an element of group VIIA, and preferably fluorine makes it possible to obtain activities, i.e., a conversion level, that are higher than with the catalysts that are known in the prior art.

Said catalyst exhibits a more significant hydrocracking activity than those of the catalytic formulas with a group VIB element base that are known from the prior art. Without subscribing to any particular theory, it seems that this particularly high activity of the catalysts of this invention is due to special properties of the sulfide of the element of group VB. The combination of such a sulfide that has acid properties with a phyllosilicate makes possible not only an improvement of the cracking properties but further an improvement of hydrogenating, hydrodesulfurizing, hydrodenitrating properties relative to the sulfide of the element of group VIB and in particular the molybdenum sulfide or tungsten sulfide that are usually used for the hydrogenating function.

The catalyst of this invention generally contains in % by weight relative to the total mass of the catalyst:

- –0.1 to 99.8%, preferably 0.1 to 90%, still more preferably 0.1 to 80%, and very preferably 0.1 to 70% of at least one clay that is selected from the group that is formed by the 2:1 dioctahedral phyllosilicates, such as, for example, montmorillonite, beidellite, vermiculite and 2:1 trioctahedral phyllosilicates, such as, for example, talc, hectorite, saponite, and preferably the phyllosilicate is synthesized in a fluoride medium that is optionally bridged; whereby said phyllosilicate exhibits a large reticular distance, preferably at least $2.0 \times 10^{-9}$ m (or 2 nm); preferably clay is a 2:1 dioctahedral phyllosilicate,
- 0.1 to 60%, preferably 0.1 to 50%, and even more preferably 0.1 to 40%, of at least one element that is selected from group VB,
- 0.1 to 99%, preferably 1 to 99% of at least one oxide-type amorphous or poorly crystallized, porous mineral matrix, whereby the catalyst can also contain:
- from 0 to 60%, preferably 0.1 to 50% and even more preferably 0.1 to 40% of at least one element that is selected from among the elements of group VIB and group VIII,
- from 0 to 20%, preferably 0.1 to 15% and even more preferably 0.1 to 10% of at least one promoter element that is selected from the group that consists of silicon, boron and phosphorus, not including the silicon that is optionally contained in clay and optionally also
- from 0 to 20%, preferably 0.1 to 15% and even more preferably 0.1 to 10% of at least one element that is selected from the group VIIA, preferably fluorine.

When it is present, the silicon promoter element is in amorphous form and located mainly on the matrix. The elements of groups VB, VIB and group VIII of the catalyst of this invention can be present completely or partially in metallic and/or oxide and/or sulfide form.

The catalysts according to the invention can be prepared by all of the methods that are known to one skilled in the art.

A preferred process for preparation of the catalyst according to this invention comprises the following stages:

a) A solid referred to as the precursor is dried and weighed, and this solid contains at least the following compounds: at least one matrix, at least one clay that is selected from the group that consists of the 2:1 dioctahedral phyllosilicates and the 2:1 trioctahedral phyllosilicates, preferably the 2:1 dioctahedral phyllosilicates that are preferably synthesized in fluoride medium and that are optionally bridged, whereby said silicates exhibit a large reticular distance, preferably at least $2.0 \times 10^{-9}$ m, optionally at least one element that is selected from among the elements of group VIB and group VIII, optionally at least one promoter element that is selected from the group that consists of boron, silicon, and phosphorus, optionally at least one element of group VIIA, whereby the whole mixture is preferably shaped, b) the dry solid that is obtained in stage a) is calcined at a temperature of at least 150° C., c) the precursor solid that is defined in stage b) is impregnated by a solution that contains at least one element of group VB, preferably niobium, d) the moist solid is allowed to remain in a moist atmosphere at a temperature of between 10 and 120° C., e) the moist solid that is obtained in stage d) is dried at a temperature of between 60 and 150° C.

The solid that is obtained at the end of any of stages a) to e) can be impregnated by at least one solution that contains all or part of at least one element that is selected by the elements of group VIB and group VIII, optionally at least one promoter element that is selected from the group that consists of boron, silicon and phosphorus and optionally at least one element of group VIIA.

The preparation of the precursor of stage a) above can be produced according to all of the standard methods of one skilled in the art. According to a preferred process of preparation, the precursor is obtained by mixing at least one matrix and at least one clay that is selected from the group that consists of the 2:1 dioctahedral phyllosilicates and the 2:1 trioctahedral phyllosilicates, then shaped, dried and calcined. The element or elements that are selected from among the elements of groups VIB, VIII and the promoter elements that are selected from the group that consists of boron, silicon and phosphorus, and/or from among the elements of group VIIA, are then introduced by any method that is known to one skilled in the art at any of stages a) to e), before or after the shaping and before or after the calcination of said mixture.

The shaping can be carried out, for example, by extrusion, by pelletizing, by the oil-drop method, by turntable granulation or by any other method that is well known to one skilled in the art. At least one calcination can be carried out after any of the stages of the preparation; it is usually carried out in air at a temperature of at least 150° C., preferably at least 300° C. Thus, the product that is obtained at the end of stage a) and/or stage e) and/or optionally after introduction of the element or elements that are selected from among the elements of groups VIB, VIII and/or among the promoter elements of the group that consists of boron, silicon, and phosphorus and/or among the elements of group VIIA, is then optionally calcined in air, usually at a temperature of at least 150° C., preferably at least 250° C., more preferably between about 350 and 1000° C.

The hydrogenating element can be introduced at any stage of the preparation, preferably during mixing, or very preferably after shaping. The shaping is followed by calcination, and the hydrogenating element is introduced before or after this calcination. The preparation ends advantageously by calcination at a temperature of 250 to 600° C. One of the preferred methods in this invention consists in mixing at least one clay that is selected from the group that consists of the 2:1 dioctahedral phyllosilicates and the 2:1 trioctahedral phyllosilicates in a moist alumina gel for several tens of minutes, then in passing the paste that is thus obtained through a die to form extrudates with a diameter of between 0.4 and 4 mm. The hydrogenating function can then be introduced in part only (a case of, for example, combinations of metal oxides of groups VIB and VIII) or completely at the time of mixing of the clay, i.e., at least one clay that is selected from the group that consists of the 2:1 dioctahedral phyllosilicates and the 2:1 trioctahedral phyllosilicates, with at least one oxide gel that is selected as a matrix. It can be introduced by one or more ionic exchange operations on the calcined support that consists of at least one clay that is selected from the group that consists of the 2:1 dioctahedral phyllosilicates and the 2:1 trioctahedral phyllosilicates, dispersed into at least one matrix, with solutions that contain the precursor salts of the selected metals when the latter belong to group VIII. It can be introduced by one or more operations for impregnating the shaped and calcined support, by a solution of the precursors of metal oxides of groups VIII (particularly cobalt and nickel), when the precursors of the metal oxides of group VIB (particularly molybdenum or tungsten) have been previously introduced at the time of mixing of the support. Finally, it can be introduced by one or more operations for impregnating the calcined support that consists of at least one clay that is selected from the group that is formed by the 2:1 dioctahedral phyllosilicates and 2:1 trioctahedral phyllosilicates and at least one matrix by solutions that contain the precursors of the metal oxides of groups VIB and/or VIII, whereby the precursors of the metal oxides of group VIII are preferably introduced after those of group VIB or at the same time as the latter.

Another possible process for preparation consists in introducing into a mixture at least one matrix with at least one clay that is selected from the group that consists of the 2:1 dioctahedral phyllosilicates and the 2:1 trioctahedral phyllosilicates, before or after the shaping and before or after the calcination of said mixture, at least one element, selected from among the elements of group VIII and group VIB.

In a preferred way, the support is impregnated by an aqueous solution. The impregnation of the support is preferably carried out by the so-called "dry" impregnation method that is well known to one skilled in the art. The impregnation can be carried out in a single stage by a solution that contains all of the constituent elements of the final catalyst.

Boron and/or silicon and/or phosphorus and optionally the element that is selected from group VIIA of the halide ions, preferably fluorine, can be introduced into the catalyst at various levels of the preparation according to any technique that is known to one skilled in the art.

A preferred method according to the invention consists in depositing, for example by impregnation, the promoter element or elements that are selected, for example the boron-silicon pair, on the precursor that may or may not be calcined, preferably calcined. For this purpose, an aqueous solution of at least one boron salt, such as ammonium biborate or ammonium pentaborate in alkaline medium and in the presence of oxidized water, is prepared, and a so-called dry impregnation is initiated, in which the volume of the pores of the precursor is filled by the boron-containing solution. In the case where, for example, silicon is deposited, a solution of a silicone-type silicon compound will be used.

The deposition of boron and silicon can also be carried out simultaneously by using, for example, a solution that contains a boron salt and a silicone-type silicon compound. Thus, for example, in the case where the precursor is a nickel-molybdenum-type catalyst that has alumina and clay as a support that is selected from the group that consists of the 2:1 dioctahedral phyllosilicates and the 2:1 trioctahedral phyllosilicates, it is possible to impregnate this precursor by the aqueous solution of ammonium biborate and Rhodorsil E1P silicone of the Rhône Poulenc Company to initiate drying, for example, at 80° C., then to impregnate by an ammonium fluoride solution, to initiate drying, for example, at 80° C. and to initiate calcination, for example, and preferably in air in a flushed bed, for example at 500° C. for 4 hours. The element of group VB is then deposited according to any method that is known to one skilled in the art.

The promoter element that is selected from the group that is formed by silicon, boron and phosphorus and the element that is selected from among the halogens of group VIIA can also be introduced by one or more impregnation operations, for example with excess solution, on the calcined precursor.

Thus, for example, it is possible to impregnate the precursor by an aqueous solution of ammonium biborate and/or Rhodorsil E1P silicone of the Rhône Poulenc Company to initiate drying at, for example, 80° C., then to impregnate by an ammonium fluoride solution, to initiate drying at, for example, 80° C., and to initiate calcination, for example, and preferably in air in a flushed bed, for example at 500° C. for 4 hours. The element of group VB is then deposited according to any method that is known to one skilled in the art.

Other impregnation sequences can be used to obtain the catalyst of this invention.

It is possible, for example, to impregnate the precursor with a solution that contains one of the promoter elements (P, B, Si), to dry, to calcine, then to impregnate the solid that is obtained with the solution that contains another promoter element, to dry and to calcine. It is also possible to impregnate the precursor with a solution that contains two of the promoter elements, to dry, to calcine then to impregnate the solid that is obtained with the solution that contains another promoter element, to dry and to initiate a final calcination. The element of group VB is then deposited according to any method that is known to one skilled in the art.

The catalyst of this invention can contain an element (metal) of group VIII such as iron, cobalt, nickel, ruthenium, rhodium, palladium, osmium, iridium or platinum. Among the elements of group VIII, preferably an element that is selected from the group that is formed by iron, cobalt, nickel and ruthenium is used. Advantageously, the following combinations of elements are used: nickel-niobium-molybdenum, cobalt-niobium-molybdenum, iron-niobium-molybdenum, nickel-niobium-tungsten, cobalt-niobium-tungsten, iron-niobium-tungsten, whereby the preferred combinations are: nickel-niobium-molybdenum, and cobalt-niobium-molybdenum. It is also possible to use combinations of four elements, for example, nickel-cobalt-niobium-molybdenum. It is also possible to use combinations that contain a noble metal such as ruthenium-niobium-molybdenum, or else ruthenium-nickel-niobium-molybdenum.

In the case where the elements are introduced in several impregnations of corresponding precursor salts, an intermediate calcination stage of the catalyst should generally be carried out at a temperature of between 250 and 600° C.

The impregnation of the molybdenum can be facilitated by adding phosphoric acid into the solutions of ammonium paramolybdate, which makes it possible also to introduce phosphorus to promote catalytic activity. Other compounds of phosphorus can be used as is well known to one skilled in the art.

The impregnation of niobium can be facilitated by adding oxalic acid and optionally ammonium oxalate in the niobium oxalate solutions. Other compounds can be used to improve solubility and to facilitate the impregnation of niobium as is well known to one skilled in the art.

The sulfurization of the solids that contain at least one element of group VB in oxide form proves to be very difficult by the majority of standard sulfurization methods that are known to one skilled in the art. Actually, for example, the catalysts that contain at least one element of group VB that is supported on an alumina-type matrix are known for being very difficult to sulfurize once the element combination of the VB-alumina group has been calcined at a temperature that is higher than 200° C.

Sulfurization can be done by any method that is known to one skilled in the art. The preferred method according to the invention consists in heating the non-calcined catalyst under a stream of a hydrogen-hydrogen sulfide mixture or under a stream of a nitrogen-hydrogen sulfide mixture or else under pure hydrogen sulfide at a temperature of between 150 and 800° C., preferably between 250 and 600° C., generally in a reaction zone with a flushed bed. Thus, for example, in the preferred case where the element of group VB is niobium and/or the element of group VIB is molybdenum, it is possible to impregnate the support, for example the alumina-clay mixture, by the ammonium heptamolybdate, to initiate drying at 80° C., then to impregnate by niobium oxalate, to initiate drying at 80° C. and to initiate sulfurization, for example, and preferably by $H_2S$ in a flushed bed, for example at 500° C. for 10 hours.

According to this invention, the 2:1 dioctahedral phyllosilicates and the 2:1 trioctahedral phyllosilicates (preferably, previously prepared in a fluoride medium in the presence of HF acid and/or another source of fluoride anions) preferably exhibit a reticular distance $d_{001}$ that is at least equal to $2.0\times10^{-9}$ m, preferably at least equal to $2.65\times10^{-9}$ m and even more preferably greater than $2.8\times10^{-9}$ m or else at least equal to $3.3\times10^{-9}$ m and generally less than or equal to $6.0\times10^{-9}$, preferably $5.0\times10^{-9}$ m. The reticular distance, represented by $d_{001}$, represents the sum of the thickness of a layer and the interlayer space. This value is directly accessible by the standard oriented-powder x-ray diffraction method.

The 2:1 trioctahedral phyllosilicates are minerals that result from the stacking of elementary layers. Each layer comprises two tetrahedral sheets that are located on both sides of an octahedral sheet. The tetrahedral sheet consists of tetrahedrons $\_O_4$ whereby 3 out of 4 peaks are common to 2 tetrahedrons and one peak is free, $\_O_{(3/2+1)}$, whereby $\_$ represents a tetrahedral cavity and $O$ represents an oxygen atom. The octahedral sheet consists of octahedrons $oO_6$, whereby the 6 peaks are common to 3 octahedrons, $oO_{6/3}$, o represents an octahedral cavity. By limiting the contents of the layer to a half-unit cell, 4 tetrahedrons $\_4O_{(6+4)}$ are located two by two on both sides of 3 octahedrons $o_3O_6$ and have in common 4 peaks: $\_4o_3O_{(12)}$. Two atoms $O$ of the octahedral sheet do not participate in this link and are saturated by atoms H: $\_4o_3O_{10}(OH)_2$. Most often, tetrahedral cavities $\_$ are occupied by silicon atoms and the 3 octahedral cavities o by magnesium atoms: $Si_4Mg_3O_{10}(OH)_2$. This structure is electrically neutral.

The tetrahedral silicon element can be substituted by trivalent elements such as, for example, aluminum and gallium. Likewise, the octahedral magnesium element can be substituted by trivalent elements (Al or Fe, for example) and/or divalent elements (Co, for example) and/or monovalent elements (Li, for example). As a whole, these substitutions impart negative charges to the structure. The latter result in the existence of exchangeable compensation cations that are located in the interlayer space. The thickness of the interlayer space depends on the nature of the compensation cations and their hydrating state. Furthermore, this space is capable of receiving other chemical types, such as water, amines, salts, alcohols, bases, etc. . . .

The approximate general chemical formula (for a half-unit cell) of the 2:1 trioctahedral phyllosilicates that are synthesized in a fluoride medium before bridging is as follows:

where S is at least one element that is selected from the group that is formed by monovalent element Li, divalent elements Zn, Ni, Co, Mn, Fe and Cu, and trivalent elements Al and Ga, T is at least one element of group IIIA and/or iron, M is at least one compensation cation that is obtained from the reaction medium, or introduced by at least one ion exchange process that is selected from the group that is formed by the cations of the elements of groups IA, IIA and VIII of the periodic table of the elements of atomic numbers from 57 to 71 inclusive), whereby the organic cations contain nitrogen (among which are the alkylammoniums and the arylammoniums), and the ammonium cation, m is the valence of cation M, x is a number between 0 and 2, y is a number between 0 and 1, z is a number between 0 and 2, n is a positive number or zero, is equal to 1 when S is a monovalent element, is equal to 0 when S is a divalent element, is equal to −1 when S is a trivalent element.

The 2:1 dioctahedral phyllosilicates are minerals that result from the stacking of elementary layers. Although the chemical bonds between the elements of the structure of the phyllosilicates are ionocovalent, they will be assumed ionic to simplify the description.

Starting from a representation where the $O^{2-}$ ions are in a plane in contact with one another, it is possible to obtain a plane that represents a hexagonal cavity, so-called hexagonal plane, by withdrawing one $O^{2-}$ ion out of two from every other row of $O^{2-}$ ions.

The structure of a 2:1 dioctahedral phyllosilicate can be shown simply from arrangements of hexagonal planes of $O^{2-}$ ions and compact planes of $O^{2-}$ and $OH^-$ ions. The OH ions fill the cavities of the hexagonal planes of $O^{2-}$ ions.

The superposition of two compact planes that are framed on both sides by a hexagonal plane makes it possible to define an octahedral sheet (O) between two tetrahedral sheets (T), hence the name of TOT layers.

Such an arrangement, also referred to as 2:1, makes it possible to define a plane of octahedral cavities that is located in the octahedral sheet between two planes of tetrahedral cavities, one in each tetrahedral sheet. Each tetrahedron has an $O^{2-}$ ion that is common with the octahedral sheet, and each of the three other $O^{2-}$ ions is shared with another tetrahedron of the same tetrahedral sheet.

The crystalline unit cell thus consists of 6 octahedral cavities that have 4 tetrahedral cavities on both sides. In the case of a phyllite that consists of elements Si, Al, O, H, such an arrangement corresponds to the ideal formula $Si_6 (Al_4\square_2) O_{20} (OH)_4$. The tetrahedral cavities contain the element silicon, and the octahedral cavities contain the element aluminum, but in this case, one octahedral cavity out of 3 is empty ($\square$). Such a unit is electrically neutral. The half-unit cell, which has the formula:

$$Si_4(Al_2\square)O_{10}(OH)_2$$

is often used.

The tetrahedral silicon element can be substituted by trivalent elements such as, for example, aluminum, gallium, or iron ($Fe^{3+}$). Likewise, the octahedral aluminum element can be substituted by:

the trivalent elements that are cited above, or a mixture of these elements, divalent elements such as, for example, magnesium.

These substitutions impart negative charges to the structure. The latter result in the existence of exchangeable compensation cations that are located in the interlayer space. The thickness of the interlayer space depends on the nature of the compensation cations and their state of hydration. Furthermore, this space is capable of receiving other chemical types, such as water, amines, salts, alcohols, and bases.

The existence of —OH groups in the 2:1 dioctahedral phyllosilicates and the 2:1 trioctahedral phyllosilicates brings about thermal instability due to the dehydroxylation reaction of equation:

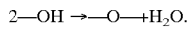

In this connection and without being tied to any theory, it is possible to think that the introduction, during synthesis, of the fluorine element in the structure in place of the O—H groups results in phyllosilicates with clearly improved thermal stability.

The preferred phyllosilicates are the 2:1 dioctahedral phyllosilicates whose characteristics are provided below, in which the columns have been introduced into the interlayer space, whereby the columns are selected from among $SiO_2$, $Al_2O_3$, $TiO_2$, $ZrO_2$, $V_2O_5$, to reach a reticular distance $d_{001}$ of at least $2.0 \times 10^{-9}$ m.

The general chemical formula (for a half-unit cell) of the 2:1 dioctahedral phyllosilicates, preferably synthesized in a fluoride medium in the presence of HF acid and/or another source of fluoride anions, before bridging is as follows:

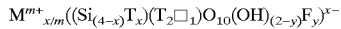

where

T represents an element that is selected from the unit that is formed by the elements of group IIIA (such as, for example, B, Al, Ga) and iron, M is at least one compensation cation that is selected from the group that is formed by the cations of elements of groups IA, IIA, and VIII, whereby the organic cations contain nitrogen, the ammonium cation, the cations of rare earths. This cation comes from the reaction medium where it is introduced by at least one exchange process. Advantageously, when the cation comes from the reaction medium, it is selected from the group that is formed by the alkalines (except lithium), the ammonium cation ($NH_4^+$), the organic cations that contain nitrogen (among which are the alkylammoniums and arylammoniums) and the organic cations that contain phosphorus (among which are the alkylphosphoniums and the arylphosphoniums). When M is a compensation cation that is introduced by post-synthesis ionic exchange, it is selected from the group that is formed by the cations of elements of groups IA, IIA and VIII of the periodic table, the rare earth cations (cations of the elements of atomic numbers from 57 to 71 inclusive), whereby the organic cations contain nitrogen (among which are the alkylammoniums and the arylammoniums) and the ammonium cation, m is the valence number of cation M, x is a number between 0 and 2 and preferably 0.1 and 0.8, y is a number between 0 and 2 if the phyllosilicate contains fluorine, y is greater than 0, □ represents an octahedral cavity.

The x-ray diffraction diagram of the 2:1 dioctahedral phyllosilicate before bridging is characterized by the presence of the following lines:

a line that characterizes the $d_{060}$ that is equal to $1.49 \pm 0.01 \times 10^{-10}$ m in the case where the 2:1 dioctahedral phyllosilicate comprises an octahedral sheet whose composition is as follows ($Al_2$□), at least one reflection 001 such that $d_{001}$ is equal to $1.25 \pm 0.3 \times 10^{-9}$ m according to the nature of the compensation cation and its state of hydration at the moisture level in question.

The fluorine content is preferably such that molar ratio F/Si is between 0.1 and 4 and preferably 0.1 and 2.

In addition, the 2:1 dioctahedral phyllosilicate exhibits at least one NMR signal with rotation at the magic angle of $^{19}F$ that is determined and well known by one skilled in the art. The chemical displacement of this signal also depends on the composition of the octahedral sheet. The signal thus corresponds to a value of:

133 ppm (±5 ppm) of NMR with rotation at the magic angle of $^{19}F$, in the case where the first neighbors of F are two aluminum atoms, which corresponds to an octahedral sheet whose composition is ($Al_2$□), 108 ppm (±5 ppm) of NMR with rotation at the magic angle of $^{19}F$, in the case where the first neighbors of F are two gallium atoms, which corresponds to an octahedral sheet whose composition is (Ga, Al□)

118 ppm (±5 ppm) of NMR with rotation at the magic angle of $^{19}F$, in the case where the first neighbors of F are an aluminum atom and a gallium atom, which corresponds to an octahedral sheet whose composition is the following (Ga, Al□). Said phyllosilicates can advantageously be synthesized in the fluoride medium in the presence of HF acid and/or another source of fluoride anions and at a pH that is less than 9, and preferably between 0.5 and 6.5.

The preparation of this type of solids in a fluoride medium and their characterization are described in the references below, whose teaching is included in this description: Patent FR-A-2673930, a publication at the 202nd meeting of the American Chemical Society (ACS) of New York in August 1991 whose contents were published in Synthesis of Microporous Materials, Extended Clays and Other Microporous Solids (1992), a report of l'Académie des Sciences [Science Academy], Paris, t. 315, Series II, pp. 545–549, 1992.

The 2:1 dioctahedral phyllosilicates that are described above and that can advantageously contain fluorine are bridged, for example, by a new process that comprises the following stages:

the 2:1 dioctahedral phyllosilicate, preferably in its ammonium form ($NH_4^+$), is suspended in a surfactant solution whose concentration varies between 0.01 mol/liter and 1 mol/liter, preferably between 0.05 and 0.7 mol/liter. The surfactants that can be used in this stage are of the anionic type, such as, by way of nonlimiting examples, alkylsulfates and alkylsulfonates, or of cationic type, among which it is possible to cite halides or tetraalkylammonium hydroxides, such as cetyltrimethylammonium chloride or else twin alkylammoniums. By way of example, hexadecyltrimethylammonium bromide, ethylhexadecyldimethyl-ammonium bromide, octadecyl trimethylammonium bromide, dodecyltrimethylammonium bromide and didodecyldimethylammonium bromide can be used. It is also possible to use other surfactants, such as triton X-100, polyethylene-oxide (POE).

After a contact time, during which the medium is stirred, for example between 5 minutes and 12 hours and preferably between 15 minutes and 6 hours and even more preferably between 15 minutes and 3 hours, the whole structure is filtered then washed with distilled water then finally dried in air or inert gas for example at a temperature of between 40 and 150° C., for a duration of between 5 minutes and 24 hours and preferably between 30 minutes and 12 hours. In the case where the phyllosilicate is not in ammonium form, it can undergo in advance all treatment known to one skilled in the art to obtain the 2:1 dioctahedral phyllosilicate for the most part in its ammonium form. By way of nonlimiting example of treatment for carrying out this transformation, it is possible to cite ion exchanges by aqueous solutions of an ammonium salt (ammonium nitrate and/or ammonium chloride), the 2:1 dioctahedral phyllosilicate that is treated according to the operating procedure that is described in the preceding stage is then brought into contact with a mixture that contains:

- at least one primary amine of $RNH_2$ type or a secondary amine R'RNH, where R and R' are selected advantageously in the structure that is formed by carbon-containing groups, alkyl groups, isoalkyl groups, naphthenyl groups, aromatic groups that may or may not be substituted by other groups and that can contain 1 to 16 carbon atoms, at least one alkoxide of an element or a mixture of alkoxides, whereby the element is selected from the structure that is formed by silicon, aluminum, zirconium, titanium, vanadium, of general formula M(OR)n, where M is the element that is described above, n is the degree of valence of said element and R is a group that is advantageously selected from the structure that is formed by the alkyl groups, isoalkyl groups, naphthenyl groups and aromatic groups that may or may not be substituted. The —OR groups can be identical or different according to the nature of group R that is selected from the structure that is defined above.
- The overall structure is left in contact, preferably while being stirred, for a duration of between 5 minutes and 12 hours and preferably between 5 minutes and 8 hours.
- The 2:1 dioctahedral phyllosilicate that is thus bridged is then filtered and then dried in air or under inert gas, for example at a temperature that is between 40 and 150° C., for a duration of between 5 minutes and 24 hours and preferably between 30 minutes and 12 hours.

This bridging process makes it possible to introduce simply and quickly columns $SiO_2$, $Al_2O_3$, $TiO_2$, $ZrO_2$, $V_2O_5$ or a mixture of these columns in the interlayer space of the 2:1 dioctahedral phyllosilicates that are advantageously prepared in a fluoride medium.

Relative to the basic 2:1 dioctahedral phyllosilicate, the bridged phyllosilicate exhibits an x-ray diffraction spectrum that makes it possible to evaluate reticular distance $d_{001}$ which therefore clearly increased to the value of at least $2.0 \times 10^{-9}$ m. It is also observed that the specific surface area increased; it is then generally between 200 and 1000 $m^2/g$ and preferably between 250 and 700 $m^2/g$. Lines $d_{060}$ in spectrum RX and the NMR lines with rotation at the magic angle of $^{19}F$ are maintained.

The porous mineral matrix that is usually amorphous or poorly crystallized generally consists of at least one refractory oxide in amorphous or poorly crystallized form. Said matrix is usually selected from the group that is formed by alumina, silica, silica-alumina or a mixture of at least two of the oxides that are cited above. It is also possible to select the aluminates. It is preferred to use matrices that contain alumina, in all of these forms that are known to one skilled in the art, for example gamma-alumina.

The element sources of group VB which can be used are well known to one skilled in the art. For example, among the niobium sources, it is possible to use oxides, such as dinobium pentaoxide $Nb_2O_5$, niobic acid $Nb_2O_5$. $HO_2O$, niobium hydroxides and polyoxoniobates, the niobium alkoxides of formula $Nb(OR_1)_3$ where $R_1$ is an alkyl radical, niobium oxalate $NbO(HC_2O_4)_5$, and ammonium niobate. Niobium oxalate or ammonium niobate is preferably used.

The sulfur source can be elementary sulfur, carbon sulfide, hydrogen sulfide, sulfur-containing hydrocarbons, such as dimethyl sulfide, dimethyl disulfide, mercaptans, thiophene compounds, thiols, polysulfides such as, for example, ditertiononylpolysulfide or TPS-37 of the ATOCHEM Company, sulfur-rich petroleum fractions such as gasoline, kerosene, gasoil, alone or mixed with one of the sulfur-containing compounds that is cited above. The preferred sulfur source is carbon sulfide or hydrogen sulfide.

The preferred phosphorus source is orthophosphoric acid $H_3PO_4$, but its salts and esters such as ammonium phosphates are also suitable. The phosphorus can be, for example, introduced in the form of a phosphoric acid mixture and a basic organic compound that contains nitrogen, such as ammonia, primary and secondary amines, cyclic amines, compounds of the pyridine family and quinolines and the compounds of the pyrrole family.

Many sources of silicon can be used. Thus, it is possible to use ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. Silicomolybdic acid and its salts, silicotungstic acid and its salts can also be advantageously used. The silicon can be added by, for example, impregnation of ethyl silicate in solution in a water/alcohol mixture. The silicon can also be added by, for example, impregnation of a silicon compound of silicone type that is suspended in water.

The boron source can be boric acid, preferably orthoboric acid $H_3BO_3$, biborate or ammonium pentaborate, boron oxide, or boric esters. Boron can be, for example, introduced in the form of a boric acid mixture, oxidized water and a basic organic compound that contains nitrogen such as ammonia, primary and secondary amines, cyclic amines, compounds of the family of pyridine and quinolines and compounds of the pyrrole family. Boron can be introduced, for example, with a boric acid solution in a water/alcohol mixture.

The sources of elements of group VIIA that can be used are well known to one skilled in the art. For example, the fluoride anions can be introduced in the form of fluorohydric acid or its salts. These salts are formed with alkaline metals, ammonium or an organic compound. In the latter case, salt is advantageously formed in a reaction mixture by reaction between the organic compound and the fluorohydric acid. It is also possible to use hydrolyzable compounds that can release fluoride anions in water, such as ammonium fluorosilicate $(NH_4)_2SiF_6$, silicon tetrafluoride $SiF_4$ or sodium tetrafluoride $Na_2SiF_{b\ 6}$. The fluorine can be introduced by, for example, impregnation of an aqueous solution of hydrofluoric acid or ammonium fluoride.

The sources of elements of group VIB which can be used are well known to one skilled in the art. For example, among the sources of molybdenum and tungsten, it is possible to use oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts. Oxides and ammonium salts such as ammonium molybdate, ammonium heptamolybdate and ammonium tungstate are preferably used.

The sources of elements of group VIII which can be used are well known to one skilled in the art. For example, for non-noble metals, nitrates, sulfates, phosphates, halides, for example chlorides, bromides and fluorides, and carboxylates, for example acetates and carbonates, will be used. For noble metals, halides will be used, for example, chlorides, nitrates, acids such as chloroplatinic acid, and oxychlorides such as ammoniacal ruthenium oxychloride.

The catalysts that are obtained by this invention are shaped in the form of grains of different shape and dimensions. They are generally used in the form of cylindrical extrudates or multilobar extrudates, such as bilobar, trilobar or polylobar extrudates of straight or twisted shape, but they can optionally be produced and used in the form of crushed powder, tablets, rings, balls, wheels. They have a specific surface area that is measured by nitrogen adsorption according to the BET method (Brunauer, Emmett, Teller, J. Am. Chem. Soc., Vol. 60, 309–316 (1938)) of between about 50 and about 600 $m^2/g$, a pore volume that is measured by porosimetry with mercury of between about 0.2 and about 1.5 $cm^3/g$ and a size distribution of pores that can be monomodal, bimodal or polymodal.

The catalysts that are obtained by this invention are used for hydrocracking feedstocks that contain hydrocarbons such as petroleum fractions. The feedstocks that are used in the process are gasolines, kerosenes, gas oils, vacuum gas oils, atmospheric residues, vacuum residues, atmospheric distillates, vacuum distillates, heavy fuels, oils, waxes and paraffins, used oils, residues or crudes that are deasphalted, feedstocks that come from thermal or catalytic conversion processes and their mixtures. They contain heteroatoms such as sulfur, oxygen and nitrogen and optionally metals.

The catalysts that are thus obtained are advantageously used for hydrocracking particularly heavy hydrocarbon fractions of vacuum distillate type, deasphalted or hydrotreated residues or the equivalent. The heavy fractions preferably consist of at least 80% by volume of compounds whose boiling points are at least 350° C. and preferably between 350 and 580° C. (i.e., corresponding to compounds that contain at least 15 to 20 carbon atoms). They generally contain heteroatoms such as sulfur and nitrogen. The nitrogen content is usually between 1 and 5000 ppm by weight and the sulfur content is between 0.01 and 5% by weight.

The hydrocracking conditions such as temperature, pressure, hydrogen recycling rate, hourly volumetric flow rate can be very variable based on the nature of the feedstock, the quality of the desired products and installations that the refiner uses. The temperature is generally higher than 200° C. and preferably between 250° C. and 480° C. The pressure is higher than 0.1 MPa and preferably higher than 1 MPa. The quantity of hydrogen is at least 50 and often between 80 and 5000 normal liters of hydrogen per liter of feedstock. The hourly volumetric flow rate is generally between 0.1 and 20 volumes of feedstock per volume of catalyst and per hour.

The catalysts of this invention are preferably subjected to a sulfurizing treatment that makes it possible to transform at least partly the metal radicals into sulfide before they are brought into contact with the feedstock that is to be treated. This activation treatment by sulfurization is well known to one skilled in the art and can be carried out by any method that is already described in the literature or in-situ, i.e., in the hydrocracking reactor, or ex-situ.

A standard sulfurization method that is well known to one skilled in the art consists in heating in the presence of hydrogen sulfide at a temperature of between 150 and 800° C., preferably between 250 and 600° C., generally in a flushed-bed reaction zone.

The catalyst of this invention can be advantageously used for hydrocracking vacuum distillate-type fractions that are high in sulfur and nitrogen, more particularly, for example, fractions with a sulfur content that is greater than 0.1% by weight and with a nitrogen content that is greater than 10 ppm.

In a first embodiment or partial hydrocracking that is still called mild hydrocracking, the conversion level is less than 55%. The catalyst according to the invention is then used at a temperature that is generally higher than or equal to 230° C., preferably between 300° C. and 480° C., and more preferably between 350° C. and 450° C. The pressure that is preferably greater than 2 MPa, more preferably 3 MPa and preferably less than 12 MPa, and more preferably less than 10 MPa. The quantity of hydrogen is at least 100 normal liters of hydrogen per liter of feedstock and preferably between 200 and 3000 normal liters of hydrogen per liter of feedstock. The hourly volumetric flow rate is preferably between 0.15 and 10 volumes of feedstock per volume of catalyst and per hour. Under these conditions, the catalysts of this invention have a better activity of conversion, hydrodesulfurization and hydrodenitrating than the commercial catalysts.

In a second embodiment, the catalyst of this invention can be used for partial hydrocracking, advantageously under conditions of moderate hydrogen pressure, fractions, for example, of vacuum distillate type that are high in sulfur and nitrogen which were previously hydrotreated. In this hydrocracking mode, the conversion level is less than 55%. In this case, the petroleum fraction conversion process takes place in two stages, whereby the catalysts according to the invention are used in the second stage. The catalyst of the first stage has a hydrotreatment function and comprises a matrix preferably with an alumina base and preferably does not contain zeolite, and at least one metal that has a hydrogenating function. Said matrix is an oxide-type amorphous or poorly crystallized porous mineral matrix. By way of non-limiting example, it is possible to cite aluminas, silicas, and silica-aluminas. It is also possible to select aluminates. It is preferred to use matrices that contain alumina under all of these forms that are known to one skilled in the art and even more preferably aluminas, for example gamma-alumina. The hydrotreatment function is ensured by at least one metal or metal compound of group VIII such as nickel and cobalt in particular. It is possible to use a combination of at least one metal or metal compound of group VIB (for example molybdenum or tungsten) and at least one metal or metal compound of group VIII (for example cobalt or nickel) of the periodic table. The total concentration of metal oxides of groups VIB and VIII is preferably between 5 and 40% by weight and more preferably between 7 and 30% by weight and the ratio by weight that is expressed in terms of metal oxide (metals) of group VIB to metal oxide (metals) of group VIII is preferably between 1.25 and 20, and more preferably between 2 and 10. In addition, this catalyst can contain phosphorus. The phosphorus content, expressed in concentration of diphosphorus pentaoxide $P_2O_5$ will preferably be at most 15%, more preferably between 0.1 and 15% by weight and very preferably between 0.15 and 10% by weight. It is also possible to contain the boron in a B/P ratio that is preferably between 1.05 and 2 (atomic), whereby the sum of the contents of boron (B) and phosphorus (P) that are expressed in terms of oxides is preferably between 5 and 15% by weight.

The first stage generally takes place at a temperature of between 350 and 460° C., preferably between 367 and 450° C., a total pressure of at least 2 MPa, preferably at least 3 MPa, an hourly volumetric flow rate of between 0.1 and 5 volumes of feedstock per volume of catalyst and per hour, preferably between 0.2 and 2 volumes of feedstock per volume of catalyst and per hour and with a quantity of hydrogen of at least 100 normal liters per liter of feedstock, and preferably between 260 and 3000 normal liters per liter of feedstock.

For the stage of conversion with the catalyst according to the invention (or second stage), the temperatures are generally greater than or equal to 230° C. and often between 300° C. and 480° C. and preferably between 300 and 450° C. The pressure is generally at least 2 MPa and preferably at least 3 MPa. The quantity of hydrogen is at least 100 liters of feedstock hydrogen and preferably between 200 and 3000 liters of hydrogen per liter of feedstock. The hourly volumetric flow rate is preferably between 0.15 and 10 volumes of feedstock per volume of catalyst and per hour. Under these conditions, the catalysts of this invention exhibit a better activity in conversion, hydrodesulfurization, hydrodenitrating and a better selectivity of middle distillates than the commercial catalysts. The service life of the catalysts is also improved in the moderate pressure range.

In another embodiment, the catalyst of this invention can be used for hydrocracking under high hydrogen pressure conditions, generally of at least 5 MPa. The treated fractions are, for example, of vacuum distillate type that are high in sulfur and nitrogen and that have been previously hydrotreated. In this hydrocracking mode, the conversion level is greater than 55%. In this case, the petroleum fraction conversion process takes place in two stages, whereby the catalyst according to the invention is used in the second stage.

The catalyst of the first stage has a hydrotreatment function and comprises a matrix that has an alumina base and preferably does not contain zeolite, and at least one metal that has a hydrogenating function. Said matrix can also consist of, or contain, silica, silica-alumina, boron oxide, magnesia, zirconia, titanium oxide or a combination of these oxides. The hydro-dehydrogenating function is ensured by at least one metal or metal compound of group VIII such as nickel and cobalt in particular. It is possible to use a combination of at least one metal or metal compound of group VIB (for example molybdenum or tungsten) and at least one metal or metal compound of group VIII (for example cobalt or nickel) of the periodic table. The total concentration of metal oxides of groups VIB and VIII is preferably between 5 and 40% by weight and more preferably between 7 and 30% by weight, and the ratio by weight that is expressed in terms of metal oxide of metal (or metals) of group VIB to metal (or metals) of group VIII is preferably between 1.25 and 20 and more preferably between 2 and 10. In addition, this catalyst can optionally contain phosphorus. The phosphorus content, expressed in concentration of diphosphorus pentaoxide $P_2O_5$ will preferably be at most 15%, and more preferably between 0.1 and 15% by weight and very preferably between 0.15 and 10% by weight. It can also contain boron in a B/P ratio that is preferably between 1.02 and 2 (atomic), whereby the sum of the contents of boron (B) and phosphorus (P) that are expressed in terms of oxides are preferably between 5 and 15% by weight.

The first stage generally takes place at a temperature of between 350 and 460° C., preferably between 360 and 450° C., a pressure of at least 2 MPa, preferably at least 3 MPa, an hourly volumetric flow rate of between 0.1 and 5 volumes of feedstock per volume of catalyst and per hour, preferably between 0.2 and 2 volumes of feedstock per volume of catalyst and per hour and with a quantity of hydrogen of at least 100 normal liters of hydrogen per liter of feedstock, and preferably between 260 and 3000 normal liters of hydrogen per liter of feedstock.

For the conversion stage with the catalyst according to the invention (or second stage), the temperatures are generally greater than or equal to 230° C., often between 300° C. and 480° C., and preferably between 330° C. and 440° C. The pressure is generally greater than 5 MPa and preferably greater than 7 MPa. The quantity of hydrogen is at least 100 liters of hydrogen per liter of feedstock and preferably between 200 and 3000 liters of hydrogen per liter of feedstock. The hourly volumetric flow rate is preferably between 0.15 and 10 volumes of feedstock per volume of catalyst and per hour.

Under these conditions, the catalysts of this invention have a better conversion activity than the commercial catalysts.

The following examples illustrate this invention without, however, limiting its scope.

Example 1

Preparation of a Hydrocracking Catalyst Support that Contains a 2:1 Dioctahedral Phyllosilicate that is Bridged and Non-Bridged The preparation relates to a PDP bridged 2:1 dioctahedral phyllosilicate, which is a 2:1 dioctahedral phyllosilicate in ammonium form.

For this preparation, the following are added to 36 g of distilled water successively and according to the indications provided:

0.385 g of $NH_4F$ salt (Prolabo) while being stirred moderately, 0.312 g of HF acid at 40% (Fluka), 2.71 g of hydrated oxyhydroxide AlOOH (Catapal B Vista) while being stirred vigorously, 2.50 g of powdered $SiO_2$ oxide (Aerosil 130 of Degussa), while being stirred moderately.

The composition of the hydrogel that is thus prepared, added to one mol of $SiO_2$ oxide is 1.0 $SO_2$; 0.44 $Al_2O_3$; 0.25 $NH_4F$; 0.15 HF; 48 $H_2O$ or in terms of the molar ratio:

Si/Al=1.136

$NH_4^+$/Si=0.25

F/Si=0.40

HF/Si=0.15

$H_2O$/Si=48

The composition does not take into account the water that is provided by the aluminum source and by the HF acid.

The hydrogel that is thus obtained is matured for 4 hours at ambient temperature (20° C.) while being stirred moderately. The pH is then close to 5.

The crystallization is then carried out in a steel autoclave, covered by a Teflon coating, with a 120 ml capacity, at 220° C., under autogenous pressure for 168 hours without stirring. The autoclave is then cooled with ambient air. The pH at the end of synthesis is about 5.5.

The product is then recovered, filtered and washed thoroughly with distilled water. It is then dried at 40–50° C. for 24 hours. At the end of these 24 hours, the product that is obtained, with 50% relative humidity, is characterized by its x-ray diffraction diagram below (Table 1).

TABLE 1

| $d_{hkl}$ ($10^{-10}$m) | I/Io |
|---|---|
| 10.87 | 73 |
| 5.32 | 12 |
| 4.46 | 100 |
| 2.58 | 30 |
| 2.56 | 43 |
| 2.2 | 46 |
| 2.1 | 77 |
| 2.0 | 77 |
| 1.69 | 11 |
| 1.49 | 22 |

The content by weight of fluorine of the phyllosilicate that is obtained is 2.9%. A signal at −133 ppm is present in the NMR spectrum, obtained by rotation at the magic angle, of $^{19}$F of the phyllosilicate that is prepared according to this example.

The 2:1 dioctahedral phyllosilicate that is thus prepared is referred to as PD. The latter can then undergo a bridging stage according to the operating procedure that is described below. 8 g of the 2:1 dioctahedral phyllosilicate that is thus prepared and referred to as PD and in ammonium form is suspended in 80 ml of a hexadecyltrimethylammonium chloride (CTMA-C1) solution of concentration 0.1 M. After an hour of stirring at ambient temperature, the whole structure is filtered, washed with 2×200 ml of distilled water, and then dried at 60° C. for 8 hours. The PD sample, previously treated with CTMA, is suspended in a mixture that consists of 4.48 g of octylamine ($C_8H_{17}NH_2$) and 60.32 g of ethyl tetraorthosilicate (Si(OEt)$_4$) and 2.96 g of aluminum isoproxide. After 30 minutes of stirring, the whole structure is filtered and then dried at 60° C. for 8 hours. The sample is then calcined at 530° C. for 3 hours in air and then for 2 hours in pure oxygen. The $d_{001}$ of the sample after calcination is 3.12 nm (31.2 Å) and a specific surface area of 375 m$^2$/g. The 2:1 dioctahedral phyllosilicate that is thus prepared is referred to as PDP.

A hydrocracking catalyst support that contains the 2:1 dioctahedral phyllosilicate PD was produced in a large quantity to be able to prepare different catalysts based on the same support. For this purpose, 19.3% by weight of 2:1 dioctahedral phyllosilicate PD is used that is mixed with 80.7% by weight of a matrix that consists of ultrafine tabular boehmite or alumina gel that is marketed under the name SB3 by the Condea Chemie GmbH [Condea Chemistry GmbH] Company. This powder mixture was then mixed with an aqueous solution that contains nitric acid at 66% by weight (7% by weight of acid per gram of dry gel) then mixed for 15 minutes. At the end of this mixing, the paste that is obtained is passed through a die that has cylindrical orifices with a diameter that is equal to 1.4 mm. The extrudates are then dried for one night at 120° C. in air and then calcined at 550° C. in air. They are called PD extrudates.

A hydrocracking catalyst support that contains PDP 2:1 dioctahedral phyllosilicate was also produced in a large quantity to be able to prepare different catalysts with a base of the same support. For this purpose, 20.5% by weight of 2:1 dioctahedral phyllosilicate PDP is used that is mixed at 79.5% by weight of a matrix that consists of ultrafine tabular boehmite or an alumina gel that is marketed under the name SB3 by the Condéa Chemie Gmbh Company. This powder mixture was then mixed with an aqueous solution that contains nitric acid at 66% by weight (7% by weight of acid per gram of dry gel) then mixed for 15 minutes. At the end of this mixing, the paste that is obtained is passed through a die that has cylindrical orifices with a diameter that is equal to 1.4 mm. The extrudates are then dried for one night at 120° C. in air and then calcined at 550° C. in air. They are called PDP extrudates.

Example 2
Preparation of Hydrocracking Catalysts that Contain a Bridged 2:1 Dioctahedral Phyllosilicate (Not in Accordance with the Invention)

The PDP support extrudates of Example 1 are impregnated in the dry state by an aqueous solution of a mixture of ammonium heptamolybdate and nickel nitrate, dried for one night at 120° C. in air and finally calcined in air at 550° C. The contents by weight of oxides of the catalyst that are obtained are indicated in Table 2. The final NiMo1 catalyst contains in particular 17.4% by weight of PDP bridged 2:1 dioctahedral phyllosilicate.

The PDP support extrudates of Example 1 are impregnated in the dry state by an aqueous solution of a mixture of ammonium heptamolybdate, nickel nitrate and orthophosphoric acid, dried for one night at 120° C. in air and finally calcined in air at 550° C. The NiMo1P catalyst is thus obtained.

The sample of the NiMo1P catalyst that is described above is impregnated by an aqueous solution that contains ammonium biborate and the emulsion of EPI Rhodorsil silicone (Rhone-Poulenc). The impregnated extrudates are then dried for one night at 120° C. and then calcined at 550° C. for 2 hours in dry air. The NiMo1PBSi catalyst is thus obtained.

Fluorine is then added to this catalyst by impregnation of a hydrofluoric acid solution that is diluted to deposit about 1% by weight of fluorine. After drying for one night at 120° C. and calcination at 550° C. for 2 hours in dry air, the NiMo1PBSiF catalyst is obtained. The characteristics of the NiMo1 catalysts are summarized in Table 2.

TABLE 2

Characteristics of the NiMo1 Catalysts

| Catalyst | NiMo1 | NiMo1 P | NiMo1 PBSi | NiMo1 PBSiF |
|---|---|---|---|---|
| MoO$_3$ (% by weight) | 12.3 | 11.8 | 11.4 | 11.2 |
| NiO (% by weight) | 2.8 | 2.7 | 2.6 | 2.6 |
| P$_2$O$_5$ (% by weight) | 0 | 4.8 | 4.6 | 4.6 |
| B$_2$O$_3$ (% by weight) | 0 | 0 | 1.8 | 1.8 |
| SiO$_2$ (% by weight) | 11.6 | 11.0 | 12.3 | 12.1 |
| F (% by weight) | 0 | 0 | 0 | 1.5 |
| Addition to 100% of for the most part Al$_2$O$_3$ (% by weight) | 73.3 | 69.7 | 67.3 | 66.2 |

Example 3
Preparation of Hydrocracking Catalysts that Contain the PDP Bridged 2:1 Dioctahedral Phyllosilicate and Niobium (According to the Invention)

The catalysts that contain the PDP bridged 2:1 dioctahedral phyllosilicate of Example 2 are impregnated by an aqueous solution of niobium oxalate Nb(HC$_2$O$_4$)$_5$, oxalic acid and ammonium oxalate. The aqueous solution that contains niobium is prepared from 1330 ml of water in which is dissolved 33 g of oxalic acid, 37.2 g of ammonium oxalate and 92.3 g of niobium oxalate. To prepare the solution, the oxalic acid and ammonium oxalate mixture is dissolved in a first step and when the solution is clear, said solution is heated to 55° C., and niobium oxalate is added. Water is then added to obtain 1330 ml of solution.

The catalysts of Example 2 above are impregnated by the so-called excess-solution method. The 1330 ml of solution are brought into contact with 380 g of catalyst. This makes it possible to deposit about 5% by weight of Nb on the catalyst. At the end of two hours, the extrudates are recovered. The latter are then dried for one night at 120° C. in a stream of dry air. The final contents of the NiMo1Nb catalysts that are thus obtained are indicated in Table 3.

TABLE 3

Characteristics of the NiMo1Nb Catalysts

| Catalyst | NiMo1 Nb | NiMo1 NbP | NiMo1 NbPBSi | NiMo1 NbPBSiF |
|---|---|---|---|---|
| $MoO_3$ (% by weight) | 11.8 | 11.3 | 10.8 | 10.7 |
| NiO (% by weight) | 2.7 | 2.6 | 2.5 | 2.5 |
| $Nb_2O_5$ (% by weight) | 4.3 | 4.2 | 4.6 | 4.2 |
| $P_2O_5$ (% by weight) | 0 | 4.6 | 4.4 | 4.4 |
| $B_2O_3$ (% by weight) | 0 | 0 | 1.7 | 1.7 |
| $SiO_2$ (% by weight) | 11.5 | 10.5 | 11.7 | 11.6 |
| F (% by weight) | 0 | 0 | 0 | 1.44 |
| Addition to 100% of for the most part $Al_2O_3$ (% by weight) | 70.1 | 66.8 | 65.3 | 63.45 |

Example 4
Preparation of Hydrocracking Catalysts that Contain a Non-Bridged 2:1 Dioctahedral Phyllosilicate (Not in Accordance with the Invention)

The support extrudates that contain the PD non-bridged 2:1 dioctahedral phyllosilicate of Example 1 are impregnated in the dry state by an aqueous solution of an ammonium heptamolybdate and nickel nitrate mixture, dried for one night at 120° C. in air and finally calcined in air at 550° C. The NiMo2 catalyst is thus obtained.

This NiMo2 catalyst is then impregnated by an aqueous solution that contains the ammonium biborate and the Rhodorsil EP1 (Rhone-Poulenc) silicone emulsion. The impregnated extrudates are then dried for one night at 120° C. and then calcined at 550° C. for 2 hours in dry air, and the NiMo2BSi catalyst is obtained. The final contents of NiMo2 catalyst oxides that are thus obtained are indicated in Table 4.

TABLE 4

Characteristics of the NiMo2 Catalysts

| Catalyst | NiMo2 | NiMo2 BSi |
|---|---|---|
| $MoO_3$ (% by weight) | 12.6 | 12.1 |
| NiO (% by weight) | 3.0 | 2.9 |
| $B_2O_3$ (% by weight) | 0 | 1.9 |
| $SiO_2$ (% by weight) | 7.7 | 9.0 |
| Addition to 100% of for the most part $Al_2O_3$ (% by weight) | 76.7 | 74.1 |

Example 5
Preparation of Hydrocracking Catalysts that Contain a Non-Bridged 2:1 Dioctahedral Phyllosilicate and Niobium (According to the Invention)

The catalysts of Example 4 above are impregnated by an aqueous solution of niobium oxalate $Nb(HC_2O_4)_5$, oxalic acid and ammonium oxalate. The aqueous solution that contains niobium is prepared from 1330 ml of water in which 33 g of oxalic acid, 37.2 g of ammonium oxalate and 92.3 g of niobium oxalate are dissolved. To prepare the solution, the mixture of oxalic acid and ammonium oxalate is dissolved in a first step, and then the solution is clear, said solution is heated to 55° C., and niobium oxalate is added. Water is then added to obtain 1330 ml of solution.

The catalysts of Example 4 above are impregnated by the so-called excess-solution method. 1330 ml of solution is brought into contact with 380 g of catalyst. This makes it possible to deposit about 5% by weight of Nb on the catalyst. At the end of two hours, the extrudates are recovered. The latter are then dried for one night at 120° C. in a stream of dry air. The final contents of NiMo2Nb catalyst oxides that are thus obtained are indicated in Table 5.

TABLE 5

Characteristics of the NiMo2Nb Catalysts

| Catalyst | NiMo2 Nb | NiMo2 NbBSi |
|---|---|---|
| $MoO_3$ (% by weight) | 12.0 | 11.6 |
| NiO (% by weight) | 2.8 | 2.7 |
| $Nb_2O_5$ (% by weight) | 4.65 | 4.83 |
| $B_2O_3$ (% by weight) | 0 | 1.8 |
| $SiO_2$ (% by weight) | 7.3 | 8.6 |
| Addition to 100% of for the most part $Al_2O_3$ (% by weight) | 73.3 | 70.6 |

Example 6
Comparison of Hydrocracking Catalysts of a Partially Converted Vacuum Gas Oil The catalysts whose preparations are described in the preceding examples are used under moderate-pressure hydrocracking conditions on a petroleum feedstock whose main characteristics are as follows:

| Density (20/4) | 0.921 |
|---|---|
| Sulfur (% by weight) | 2.46 |
| Nitrogen (ppm by weight) | 1130 |
| Simulated distillation | |
| Starting point | 365° C. |
| 10% point | 430° C. |
| 50% point | 472° C. |
| 90% point | 504° C. |
| Final point | 539° C. |
| Pour point | +39° C. |

The catalytic test unit comprises two fixed-bed reactors with ascending circulation of the feedstock ("up-flow"). In the first reactor, the one in which the feedstock passes first, the catalyst of first hydrotreatment stage HtH548 that is sold by the Procatalyse Company and that comprises an element of group VI and an element of group VIII that are deposited on alumina are introduced. In the second reactor, the one in which the feedstock passes last, a hydrocracking catalyst that is described above is introduced. In each of the reactors, 40 ml of catalyst is introduced. The two reactors operate at the same temperature and at the same pressure. The operating conditions of the test unit are as follows:

| | |
|---|---|
| Total pressure | 5 MPa |
| Hydrotreatment catalyst | 40 cm³ |
| Hydrocracking catalyst | 40 cm³ |
| Temperature | 400° C. |
| Hydrogen flow rate | 20 l/h |
| Feedstock flow rate | 40 cm³/h |

The two catalysts undergo an in-situ sulfurization stage before reaction. We note that any in-situ or ex-situ sulfurization method is suitable. Once the sulfurization is carried out, the feedstock that is described above can be transformed.

The catalytic performance levels are expressed by gross conversion at 400° C. (GC), by gross selectivity of middle distillates (GS) and by conversions of hydrodesulfurization (HDS) and hydronitrating (HDN). These catalytic performance levels are measured on the catalyst after a stabilization period, generally at least 48 hours, has elapsed.

Gross conversion GC. is assumed to be equal to:

GG=% by weight of $380^{minus}$ of the effluent, whereby $38^{minus}$ represents the fraction that is distilled at a temperature that is less than or equal to 380° C.

Gross selectivity GS of middle distillates is assumed to be equal to:

GS=100·weight of the fraction (150° C–380° C.)/weight of the fraction $380^{minus}$ of the effluent The HDS hydrodesulfurization conversion is assumed to be equal to:

$HDS = (S_{initial} - S_{effluent})/S_{initial} \cdot 100 = (24600 - S_{effluent})/24600 \cdot 100$ The HDN hydrodenitrating conversion is assumed to be equal to:

$HDN = (N_{initial} - N_{effluent})/N_{initial} \cdot 100 = (1130 - N_{effluent})/1130 \cdot 100$ In the following table, we recorded gross conversion GC at 400° C., gross selectivity GS, hydrodesulfurizing conversion HDS and hydrodenitrating conversion HDN for the four catalysts.

TABLE 6

Catalytic Activities of the Partial Hydrocracking Catalysts at 400° C.

| | GC (% by weight) | GS (%) | HDS (%) | HDN (%) |
|---|---|---|---|---|
| NiMo1 (PDP) | 42.9 | 81.0 | 98.1 | 92.5 |
| NiMo1Nb (PDP) | 44.2 | 80.8 | 98.4 | 94.0 |
| NiMo1P (PDP) | 43.1 | 81.1 | 98.4 | 93.9 |
| NiMo1PNb (PDP) | 44.5 | 80.5 | 98.6 | 94.8 |
| NiMO1PBSi (PDP) | 44.7 | 81.1 | 98.7 | 96.6 |
| NiMo1NbPBSi (PDP) | 45.1 | 80.4 | 98.8 | 97.0 |
| NiMo1PBSiF (PDP) | 46.2 | 80.6 | 98.8 | 97.5 |
| NiMo1NbPBSiF (PDP) | 46.7 | 80.2 | 98.9 | 97.8 |

The results of Table 6 show that the addition of the element of group VB provides an improvement of the performance levels of the catalyst that contains a bridged conversion and HDN 2:1 dioctahedral phyllosilicate. The gross selectivity of the middle distillates tends to decrease because of the increase of the conversion level, as is well known. The catalysts of the invention that contain a bridged 2:1 dioctahedral phyllosilicate and an element of group VB are therefore particularly advantageous for partial hydrocracking of vacuum distillate-type feedstock that contains nitrogen at a moderate hydrogen pressure.

Example 7
Hydrocracking Tests of a High-Conversion Vacuum Distillate

The catalysts whose preparations are described in Examples 2 and 5 above are used under high-conversion hydrocracking conditions (60–100%) on a vacuum distillate-type petroleum feedstock with a high content of sulfur and nitrogen whose main characteristics are as follows:

| | |
|---|---|
| Density at 15° C. | 0.912 |
| Sulfur | 2.22% by weight |
| Total nitrogen | 598 ppm by weight |
| Simulated distillation | |
| P1 | 345° C. |
| 10% | 375° C. |
| 50% | 402° C. |
| 90% | 428° C. |
| PF | 467° C. |

The catalytic test unit comprises a fixed-bed reactor with ascending circulation of the feedstock ("up-flow"). The hydrocracking test is conducted under the following operating conditions:

| | |
|---|---|
| Total pressure | 20 MPa |
| Catalyst volume | 40 cm³ |
| Temperature | 380 to 420° C. |
| Hydrogen flow rate | 24 l/h |
| Feedstock flow rate | 20 cm³/h |

Each of the catalysts is sulfurized before the test at 350° C. and at a total pressure of 20 MPa per feedstock to which was added 2% by weight of dimethyl disulfide (DMDS).

Under these conditions, the catalytic performance levels of hydrodesulfurization (HDS) and hydrodenitrating (HDN) are such that the sulfur and nitrogen contents in the effluent are less than the detection limit of the standard analysis techniques. This observation is normal, taking into account the high pressure of hydrogen used. The focus is then mainly gross conversion (GC). These catalytic performance levels are measured in the catalyst after a stabilization period, generally at least 48 hours, has elapsed.

Gross conversion GC is assumed to be equal to:

GC=% by weight of $380^{minus}$ of effluent

In Table 7 below, we recorded gross conversion GC at 410° C. for the catalysts that are tested under these conditions and the gross selectivity of middle distillates (150–380° C.).

TABLE 7

Catalytic Activities of the High-Conversion Hydrocracking Catalysts

| | GC (%) | GS (%) |
|---|---|---|
| NiMo1 (PDP) | 76.1 | 70.3 |
| NiMo1Nb (PDP) | 77.8 | 69.8 |
| NiMo1P (PDP) | 77.4 | 70.0 |
| NiMo1NbP (PDP) | 79.3 | 68.4 |
| NiMo1PBSi (PDP) | 84.2 | 66.8 |
| NiMo1NbPBSi (PDP) | 85.0 | 66.6 |
| NiMo1PBSiF (PDP) | 85.1 | 66.2 |
| NiMo1NbPBSiF (PDP) | 86.5 | 66.0 |
| NiMo1 (PD) | 73.2 | 71.1 |

TABLE 7-continued

Catalytic Activities of the High-Conversion
Hydrocracking Catalysts

|  | GC (%) | GS (%) |
|---|---|---|
| NiMo1Nb (PD) | 76.4 | 69.6 |
| NiMo1Bsi (PD) | 78.4 | 68.3 |
| NiMo1NbBSi (PD) | 83.2 | 67.5 |

The addition of niobium to catalysts that contain bridged 2:1 dioctahedral phyllosilicate makes it possible to improve the conversion activity, which is reflected by an increase of the conversion level at 410° C. The gross selectivity of middle distillates decreases because of the increase of the conversion level, as is well known.

The NiMo1PBSi catalyst that contains the bridged 2:1 dioctahedral phyllosilicate and an element of group VB is therefore particularly advantageous for use in processes for hydrocracking vacuum distillate-type feedstocks with a high content of sulfur and nitrogen, generally referred to as hydrocracking with an amorphous catalyst, at a high hydrogen pressure.

Likewise, the addition of niobium to the NiMo2 catalyst that contains the non-bridged 2:1 dioctahedral phyllosilicate makes it possible to improve the conversion activity, which is reflected by an increase of the conversion level at 410° C. The gross selectivity of middle distillates decreases because of the increase of the conversion level as is well known.

In addition, if fluorine is added, an improvement of the conversion level and therefore of the converting activity are also noted.

What is claimed is:

1. Catalyst that comprises at least one oxide-type amorphous or poorly crystallized matrix, at least one element of group VB and at least one clay that is selected from the group that consists of the 2:1 dioctahedral phyllosilicates and the 2:1 trioctahedral phyllosilicates and in which the phyllosilicate is bridged and has a reticular distance of at least $2.65 \times 10^{-9}$ m.

2. Catalyst according to claim 1 in which the phyllosilicate contains fluoride anions in a molar ratio of F/Si of 0.1:1 to 4:1.

3. Catalyst according to claim 1, in which the clay is a 2:1 dioctahedral phyllosilicate.

4. Catalyst according to claim 1 that also comprises at least one promoter element that is selected from the group that consists of boron, silicon and phosphorus.

5. Catalyst according to claim 1 in which the element of group VB is niobium.

6. Catalyst according to claim 1 that also comprises at least one element that is selected from among the elements of group VIB and group VIII.

7. Catalyst according to claim 6, in which the element of group VIB is molybdenum or tungsten, and the element of group VIII is iron, cobalt or nickel.

8. Catalyst according to claim 1 that also comprises at least one element that is selected from group VIIA.

9. Catalyst according to claim 1 that contains in % by weight relative to the total mass of the catalyst:
0.1 to 99.8% of at least one clay that is selected from the group that is formed by the 2:1 dioctahedral phyllosilicates and the 2:1 trioctahedral phyllosilicates,
0.1 to 60% of at least one element that is selected from group VB,
0.1 to 99% of at least one oxide-type amorphous or poorly crystallized, porous mineral matrix,
from 0 to 60% of at least one element that is selected from among the elements of group VIB and group VIII,
from 0 to 20% of at least one promoter element that is selected from the group that consists of silicon, boron and phosphorus, not including the silicon that is optionally contained in clay,
from 0 to 20% of at least one element that is selected from the group VIIA.

10. Process of preparation of a catalyst according to claim 1 in which:
a) a solid precursor is dried and weighed, and this solid contains at least the following compounds: at least one matrix, at least one clay that is selected from the group that consists of the 2:1 dioctahedral phyllosilicates and the 2:1 trioctahedral phyllosilicates, optionally at least one element that is selected from among the elements of group VIB and group VIII, optionally at least one promoter element that is selected from the group that consists of boron, silicon, and phosphorus, optionally at least one element of group VIIA, the mixture preferably being shaped,
b) the dry solid that is obtained in stage a) is calcined at a temperature of at least 150° C.,
c) the precursor solid that is defined in stage b) is impregnated by a solution that contains at least one element of group VB,
d) the moist solid is allowed to remain in a moist atmosphere at a temperature of between 10 and 120° C.,
e) the moist solid that is obtained in stage d) is dried at a temperature of between 60 and 150° C.

11. Process of preparation according to claim 10, in which the catalyst is impregnated by at least one solution that contains some or all of at least one element that is selected by the elements of group VIB and group VIII, optionally at least one promoter element that is selected from the group that consists of boron, silicon and phosphorus and optionally at least one element of group VIIA.

12. Process of preparation of a catalyst according to one of claim 10 which at least one calcination is carried out at the end of any of the stages of the preparation, at a temperature of at least 150° C.

13. Process of preparation according to claim 10, in which sulfurization of the catalyst is initiated under a stream of a hydrogen/hydrogen sulfide mixture or else under pure hydrogen sulfide, at a temperature of between 150 and 800° C.

14. In a catalytic process for hydrocracking feedstocks that contain hydrocarbon, the improvement wherein the catalyst is in accordance with claim 1.

15. A process according to claim 14 in which the temperature is greater than 200° C., the pressure is greater than 0.1 MPa, the quantity of hydrogen is at least 50 liters of hydrogen per liter of feedstock, and the hourly volumetric flow rate is between 0.1 and 20 volumes of feedstock per volume of catalyst and per hour.

16. A process according to claim 14 in a soft hydrocracking process in which the conversion level is less than 55%, the temperature is greater than 230° C., the pressure is greater than 2 MPa and less than 12 MPa, the quantity of hydrogen is at least 100 liters of hydrogen per liter of feedstock, and the hourly volumetric flow rate is between 0.15 and 10 volumes of feedstock per volume of catalyst and per hour.

17. A process according to claim 14 in a hydrocracking process, in which the conversion is greater than 55%, the temperature is greater than 230° C., the pressure is greater than 5 MPa, the quantity of hydrogen is at least 100 liters of hydrogen per liter of feedstock, and the hourly volumetric flow rate is between 0.15 and 10 volumes of feedstock per volume of catalyst and per hour.

18. A process according to claim 14 in which a hydrotreatment stage is carried out at a temperature of between 350° C. and 460° C., a pressure of at least 2 MPa, with a quantity of hydrogen of at least 100 liters of hydrogen per liter of feedstock, an hourly volumetric flow rate of between 0.1 and 5 volumes of feedstock per volume of catalyst and per hour, and prior to the hydrocracking stage.

19. Catalyst according to claim 4 that also comprises at least one element that is selected from among the elements of group VIB and group VIII.

20. Catalyst according to claim 19 that also comprises at least one element that is selected from group VIIA.

21. A catalyst produced by the process of claim 10.

22. A catalyst according to claim 1, wherein said reticulate distance is greater than $2.8 \times 10^{-9}$ m.

23. A catalyst according to claim 1, wherein said reticulate distance is greater than $3.3 \times 10^{-9}$ m.

24. A catalyst according to claim 1, wherein said reticulate distance is not more than $6.0 \times 10^{-9}$ m.

25. A catalyst according to claim 1, wherein said reticulate distance is not more than $5.00 \times 10^{-9}$ m.

* * * * *

UNITED STATES PATENT AND TRADEMARK OFFICE
CERTIFICATE OF CORRECTION

| | | |
|---|---|---|
| PATENT NO. | : 6,251,261 B1 | Page 1 of 1 |
| APPLICATION NO. | : 09/344348 | |
| DATED | : June 26, 2001 | |
| INVENTOR(S) | : Slavik Kasztelan et al. | |

It is certified that error appears in the above-identified patent and that said Letters Patent is hereby corrected as shown below:

Column 23, line 49, reads "claim 1 in" should read -- claim 1, in --
Column 24, line 21, reads "the mixture preferably" should read -- the structure preferably --
Column 24, line 41, reads "claim 10 which" should read -- claim 10, in which --
Column 24, line 66, reads "claim 14 in a" should read -- claim 14, in a --
Column 25, line 6, reads "claim 14 in which" should read -- claim 14, in which --

Signed and Sealed this

Twentieth Day of February, 2007

JON W. DUDAS
*Director of the United States Patent and Trademark Office*